Patented Feb. 1, 1927.

1,616,378

UNITED STATES PATENT OFFICE.

WALTER KROPP, OF ELBERFELD, NEAR COLOGNE-ON-THE-RHINE, GERMANY, ASSIGNOR TO I. G. FARBENINDUSTRIE AKTIENGESELLSCHAFT, OF FRANKFORT-ON-THE-MAIN, GERMANY.

VULCANIZATION OF RUBBER AND THE PRODUCT THEREOF.

No Drawing. Application filed March 5, 1926, Serial No. 92,621, and in Germany August 6, 1925.

The present invention concerns the production of particularly well vulcanized materials which are obtained when small amounts of the condensation products of $\alpha$-.$\beta$-substituted acroleines with aromatic amines are employed as vulcanization accelerators. The acceleration of the vulcanization becomes particularly noticeable when pressures of from 2 to 3 atmospheres are employed, so that any premature vulcanization is avoided.

The condensation products of $\alpha$-.$\beta$-substituted acroleines with aromatic amines by far surpass in technical utility the corresponding acroleine derivatives, manufactured according to British Patent No. 156,-118. They are generally oily and insoluble in water but are soluble in organic solvents and readily miscible with the rubber compositions.

The following examples will serve to illustrate my invention:—

Example 1.

A mixture of 100 parts by weight of Ceylon creps, 7 parts by weights of sulphur and 1 part by weight of the condensation product obtained from $\alpha$-ethyl-$\beta$-propyl-acroleine and aniline is heated for 30 minutes at about 143° C. under 3 atmospheres pressure. A vulcanized material results possessing excellent mechanical properties.

Example 2.

A mixture of 100 parts by weight of smoked sheets, 10 parts by weight of zinc white, 6 parts by weight of sulphur and 1 part by weight of the condensation product obtained from $\alpha$-ethyl-$\beta$-propyl-acroleine and aniline is vulcanized under 2 atmospheres pressure at 133° C. A good vulcanized product is obtained.

Example 3.

A mixture of 100 parts by weight of smoked sheets, 40 parts by weight of zinc white, 6 parts by weight of sulphur and 2 parts by weight of the condensation product obtained from $\alpha$-isopropyl-$\beta$-isobutyl-acroleine and aniline is vulcanized for 30 minutes under 3 atmospheres pressure at 143° C. A vulcanized product of outstanding properties is obtained.

The following examples illustrate the formation of the $\alpha$-.$\beta$-substituted acroleine- aromatic amine condensation products:

Example 4.

To 39 parts by weight of $\alpha$-ethyl-$\beta$-propyl-acroleine dissolved in 60 volumes of benzene 21 parts by weight of aniline in 25 volumes of benzene are added, whereupon heating is effected under reflux on the water bath for from 3 to 4 hours. In the course of the reaction water separates out. The benzene and water are eliminated and the residue is then heated for several hours at 130° C. in a vacuum of 12 mm. of mercury. The residue is liquid and is soluble with difficulty in water and in dilute acetic acid, but easily soluble in organic solvents.

Example 5.

200 parts by weight of aniline are mixed with 200 parts by weight of crude $\alpha$-ethyl-$\beta$-propyl acroleine (as obtained from normal butyl aldehyde by stirring with dilute caustic soda lye until the whole of the butyl aldehyde has disappeared). Owing to the reaction the mixture becomes heated and after some minutes water separates out. The product is then heated for from 1 to 2 hours first on a water bath and subsequently on an oil both to 140° C., after which the excess of aniline is removed in a vacuum at 145° C., an oily residue remaining.

Example 6.

150 parts by weight of $\alpha$-isopropyl-$\beta$-isobutyl-acroleine are mixed with 120 parts by weight of aniline, 50 parts by weight of anhydrous zinc chloride are added and the whole is heated on a water bath for several hours. The zinc chloride is then removed by extraction with water and the remaining oil, if desired after solution in benzene is heated in a vacuum for several hours at 140° C. Instead of zinc chloride other condensing agents may be employed.

I claim:—

1. The process of producing a vulcanized rubber which comprises incorporating into rubber a small amount of a condensation product of $\alpha$-.$\beta$-substituted acroleines with aromatic amines.

2. As a new article of manufacture a vulcanized rubber, combined before vulcanization with a small amount of a condensation product of $\alpha$-.$\beta$-substituted acroleines with aromatic amines.

In testimony whereof I have hereunto set my hand.

WALTER KROPP.